(12) United States Patent
Ionescu et al.

(10) Patent No.: US 10,748,039 B2
(45) Date of Patent: Aug. 18, 2020

(54) REINFORCEMENT LEARNING NEURAL NETWORKS GROUNDED IN LEARNED VISUAL ENTITIES

(71) Applicant: DeepMind Technologies Limited, London (GB)

(72) Inventors: Catalin-Dumitru Ionescu, London (GB); Tejas Dattatraya Kulkarni, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/586,262

(22) Filed: Sep. 27, 2019

(65) Prior Publication Data

US 2020/0104645 A1    Apr. 2, 2020

Related U.S. Application Data (60) Provisional application No. 62/737,850, filed on Sep. 27, 2018.

(51) Int. Cl.
| | |
|---|---|
| *G06K 9/62* | (2006.01) |
| *G06F 16/56* | (2019.01) |
| *G06N 3/04* | (2006.01) |
| *G06N 3/08* | (2006.01) |

(52) U.S. Cl.
CPC ......... *G06K 9/6262* (2013.01); *G06F 16/56* (2019.01); *G06N 3/04* (2013.01); *G06N 3/08* (2013.01)

(58) Field of Classification Search
CPC ........ G06K 9/6262; G06F 16/56; G06N 3/04; G06N 3/08
See application file for complete search history.

(56) References Cited

U.S. PATENT DOCUMENTS

| 6,473,851 B1 * | 10/2002 | Plutowski | G06N 20/00 713/1 |
|---|---|---|---|
| 10,282,662 B2 * | 5/2019 | Schaul | G06N 3/08 |
| 2018/0342174 A1 * | 11/2018 | Zhang | G06F 17/2715 |
| 2019/0073353 A1 * | 3/2019 | Yu | G06K 9/46 |
| 2019/0130312 A1 * | 5/2019 | Xiong | G06N 3/0454 |
| 2019/0266449 A1 * | 8/2019 | Viola | G06N 3/0454 |

OTHER PUBLICATIONS

Van den Oord, Aaron, and Oriol Vinyals. "Neural discrete representation learning." Advances in Neural Information Processing Systems. 2017. (Year: 2017).*

Anonymous, "Learning to Control Visual Abstraction for Structured Exploration in Deep Reinforcement Learning" ICLR, 2018, 12 pages.

(Continued)

*Primary Examiner* — Utpal D Shah
(74) *Attorney, Agent, or Firm* — Fish & Richardson P.C.

(57) ABSTRACT

A reinforcement learning neural network system in which internal representations and policies are grounded in visual entities derived from image pixels comprises a visual entity identifying neural network subsystem configured to process image data to determine a set of spatial maps representing respective discrete visual entities. A reinforcement learning neural network subsystem processes data from the set of spatial maps and environmental reward data to provide action data for selecting actions to perform a task.

20 Claims, 6 Drawing Sheets

(56) References Cited

OTHER PUBLICATIONS

Barber et al., "Information maximization in noisy channels: A variational approach" Advances in Neural Information Processing Systems 16, pp. 201-208, 2004, 8 pages.

Beattie et al., "DeepMind Lab" CoRR, abs/1612.03801, 2016, 11 pages.

Belghazi et al., "Mutual Information Neural Estimation" Proceedings of the 35th International Conference on Machine Learning, vol. 80, pp. 531-540, 2018, 10 pages.

Diuk et al., "An object-oriented representation for efficient reinforcement learning" Proceedings of the 25th International Conference on Machine Learning, pp. 240-247, 2008, 8 pages.

Dubey et al., "Investigating human priors for playing video games" arXiv:1802.10217, 2018, 9 pages Espeholt et al., "IMPALA: Scalable Distributed Deep-RL with Importance Weighted Actor-Learner Architectures," arXiv, Jun. 2018, 22 pages.

Gregor et al., "Variational intrinsic control" CoRR, abs/1611.07507, 2016, 15 pages.

Jaderberg et al., "Reinforcement learning with unsupervised auxiliary tasks" arXiv:1611.05397, 2016, 14 pages.

Ji et al., "Invariant information distillation for unsupervised image segmentation and clustering" CoRR, abs/1807.06653, 2018, 13 pages.

Kulkarni et al., "Hierarchical deep reinforcement learning: Integrating temporal abstraction and intrinsic motivation" Advances in Neural Information Processing Systems, pp. 3675-3683, 2016, 14 pages.

Mnih et al., "Human-level control through deep reinforcement learning" Nature, 518(7540):529, 2015, 13 pages.

Ostrovski et al., "Count-based exploration with neural density models" ICML, vol. 70, Proceedings of Machine Learning Research, pp. 2721-2730, 2017, 10 pages.

Ren et al., "Learning a classification model for segmentation" ICCV, pp. 10-17, IEEE Computer Society, 2003, 8 pages.

Romera-Paredes et al., "Recurrent instance segmentation" European Conference on Computer Vision, pp. 312-329, 2016, 24 pages.

Schaul et al., "Universal value function approximators" International Conference on Machine Learning, pp. 1312-1320, 2015, 9 pages.

Shi et al., "Normalized cuts and image segmentation" IEEE Trans. Pattern. Anal. Mach. Intell., 22(8):888-905, 2000, 18 pages.

Spelke et al., "Core knowledge" Development Science, 10(1):89-96, 2007, 9 pages.

Sutton et al., "Between MDPs and semi-MDPs: A framework for temporal abstraction in reinforcement learning" Artificial intelligence, 112(1-2):181-211, 1999, 31 pages.

Sutton et al., "Horde: A scalable real-time architecture for learning knowledge from unsuoervised sensorimotor interaction" The 10th International Conference on Autonomous Agents and Multiagent Systems—vol. 2, pp. 761-768, 2011, 8 pages.

Sutton et al., "Introduction to Reinforcement Learning" MIT Press, 1998, 20 pages.

Van den Oord et al., "Neural discrete representation learning" Advances in Neural Information Processing Systems, pp. 6306-6315, 2017, 11 pages.

Van den Oord et al., "Representation learning with contrastive predictive coding" CoRR, abs/1807.03748, 2018, 13 pages.

Van Seijen et al., "Hybrid reward architecture for reinforcement learning" Advances in Neural Information Processing Systens, pp. 5392-5402, 2017, 16 pages.

Wang et al., "Dueling Network Architectures for Deep Reinforcement Learning," arXiv, Apr. 2016, 15 pages.

Xia et al., "W-net: A deep model for fully unsupervised image segmentation" CoRR, abs/1711.08506, 2017, 13 pages.

Kanezaki, "Unsuoervised Image Segmentation by Backpropagation", 2018 IEEE International Conference on Acoustics Speech and Signal Processing (ICASSP), Apr. 2018, 1543-1547.

Lee et al., "Unsupervised Representation Learning by Sorting Sequences," 2017 IEEE International Conference on Computer Vision (ICCV), Oct. 2017, 667-676.

PCT International Search Report and Written Opinion in International Appln. No. PCT/EP2019/076154, dated Jan. 8, 2020, 20 pages.

\* cited by examiner

REINFORCEMENT LEARNING NEURAL NETWORKS GROUNDED IN LEARNED VISUAL ENTITIES

CROSS-REFERENCE TO RELATED APPLICATION

This application claims priority to U.S. Provisional Application No. 62/737,850, filed on Sep. 27, 2018. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

Reinforcement learning neural network systems can learn to perform complex tasks but the basis upon which actions are selected is typically encoded within the system in a way which is difficult for a human to understand. This specification describes reinforcement learning systems in which internal representations and policies are grounded in visual entities derived from image pixels. These visual entities can be interrogated, e.g. displayed, to make it easier for a human to understand the basis on which the systems select actions.

Some of the systems described in this specification use options-based reinforcement learning techniques. Generally an option may refer to a series of individual or "atomic" actions. In some instances following initiation, e.g. based on an initiation condition, the option may have an internal policy which is followed whilst selecting the actions, and a termination condition. Reinforcement learning methods may be employed to learn the internal policy. However an options-based approach is not essential to implement some of the techniques described herein.

In one aspect there is provided a reinforcement learning neural network system. The system may be implemented as computer programs on one or more computers in one or more locations.

The system may comprise an input to receive observation data defining an observation of an environment. The observation may comprise, for example, monochrome or color image, a short sequence of images, for example concatenated; or video. The same or another input may receive environmental reward data from the environment defining an extrinsic reward received (by an agent) in response to performing an action. The system may have an output to provide action data for selecting an action to be performed by an agent acting in the environment.

The system may also include a visual entity identifying neural network subsystem, such as a convolutional neural network (CNN), configured to process the observation data to determine a set of (K) spatial maps for the one or more images. Each spatial map may represent one of a set of (K) discrete visual entities, which may be learned by the system. Each spatial map may comprise a number of map pixels, which may correspond with image pixels though potentially at a different, for example lower resolution. Thus each map pixel may identify whether a corresponding region of the one or more images is associated with, i.e. represents the discrete visual entity corresponding to the spatial map.

The system may also include a reinforcement learning neural network subsystem configured to process data from the set of spatial maps and the environmental reward data to provide the action data. Typically the reinforcement learning neural network subsystem will also receive and process the observation data.

In broad terms each spatial map may represent, more particularly may learn to represent a concept useful for reinforcement learning but grounded in the observations, that is in the images. The concept may comprise a combination of one or more of features of visual elements such as walls, objects and the like, features relevant to motion of the agent and/or an object within the environment, and features which can potentially be influenced by actions in the environment. Thus the visual entities may provide an abstract or partly abstract representation of an observation but because of their spatial nature may be readily visualized by a human, for example as a map. In this way some insight may be gained into the operation of the reinforcement learning system. This can be useful for regulatory and other purposes; for example if the motivations for the actions of an autonomous system can be discerned it is easier to trust such a system.

In some implementations each pixel or group of pixels may be assigned to one of the set of K visual entities. The set of spatial maps may then define a set of image segmentation masks in which each mask corresponds to a spatial mapping for one of the visual entities, indicating where in the observation the entity is present, effectively mapping the (partly abstract) visual entity.

In some implementations, to perform the assignment an entity encoding neural network is configured to encode the observation data into an activation for each map pixel. A vector quantizer (VQ) may then assign the activation for each map pixel to an embedding vector representing one of the discrete visual entities to categorize the map pixel into 1 of the K discrete visual entities. For example the nearest embedding vector to an activation vector representing the activation may be identified and the vector quantizer output (spatial map pixel) corresponding to this vector labelled with a 1, the other outputs for this pixel (in other spatial maps) being 0.

The parameters of the entity encoding neural network and/or the embedding vectors may be learned using an unsupervised learning technique. In some implementations they may be learned separately to the parameters of the reinforcement learning (RL) neural network subsystem. However the visual entity identifying subsystem can provide a relatively rich source of training gradients for the reinforcement learning (RL) neural network subsystem particularly while the RL subsystem is in an early, exploratory phase and extrinsic rewards are relatively rare. Thus, as described in more detail later, the system can at a relatively early stage learn sets of actions, or options, and some of these may afterwards be used by the reinforcement learning system as higher level control commands, where it turns out that they are useful, for receiving an extrinsic reward.

As previously described the visual entity identifying neural network/VQ subsystem may be trained to represent spatial maps (masks or image segmentations) representing features of image/environment appearance, object motion, and action-changeable aspects of the environment.

Thus the system may include an image appearance encoding neural network coupled to the observation data input to provide encoded image appearance data spatially corresponding to the map pixels. This may then be used to train the visual entity identifying neural network/VQ subsystem to generate spatial maps representing features of image appearance, e.g. color by encoding data from one or more color channels. For example color can help distinguish elements of an environment such as walls, ground, objects and so forth. A visual entity identifying subsystem trainer may be configured to train the visual entity identifying neural network subsystem with a loss function dependent on a difference between distributions of the encoded image appearance data and the activation for each map pixel. For example positive and negative training examples can be generated from image patches which are spatially aligned and non-aligned between the spatial map and encoded image appearance. A cross-entropy loss may be employed.

The system may additionally or alternatively include a frame encoding neural network configured to encode the set of spatial maps into frame embedding data for a current frame, where a frame may represent one or more images. A visual entity identifying subsystem trainer may be configured to train the visual entity identifying neural network subsystem (and frame encoding neural network) to distinguish frames inside and outside a time window number of frames distant from the current frame, later an "unroll", for example using a classification loss. A difference between these frames represents change such as motion, and thus the subsystem may learn to map elements of a frame which may move.

The system may additionally or alternatively include an action encoding neural network configured to encode the action data for training the visual entity identifying neural network subsystem. A visual entity identifying subsystem trainer may be configured to train the visual entity identifying neural network subsystem (and action encoding neural network) dependent upon a difference between frames within and outside a time window and dependent upon an action taken, more specifically the encoded action data. The system may be trained using a classification loss based on a taken/not-taken action within the time window; the time window may be a single frame, i.e. consecutive frames may be processed. A difference between these frames represents change due to agent action, and thus the subsystem may learn to map agent-controllable elements of a frame and/or to predict from a frame what elements may be changed by agent action.

In some implementations the visual entity identifying neural network subsystem, or another image pre-processing subsystem used with the reinforcement learning neural network system, may be trained to represent visual entities specific to a particular task, such as controlling an autonomous or semi-autonomous vehicle. For example a visual entity identifying subsystem trainer may be configured to train the visual entity identifying neural network subsystem with a classification or other loss function dependent on the presence or otherwise of one or more task-relevant objects in an image. These might include, for example, static objects such as road signs, changing objects such as traffic lights or gantry-mounted displays, and/or moving objects such as pedestrians or cyclists.

In implementations the spatial maps (later referred to as masks), are used to generate intrinsic, i.e. internal, rewards which can be used by the RL subsystem to learn options, in implementations series of actions aimed at maximizing an intrinsic reward.

Thus an intrinsic reward generation subsystem may be configured to process each of the spatial maps (masks) to generate internal, intrinsic reward data. In implementations an intrinsic reward is derived from one or more geometric properties of a spatial map. For example where a spatial map comprises a (binary) mask such geometric features may include a maximum or minimum position of the mask in an x- or y-direction, a maximum or minimum area of the mask, a centroid position of the mask, and so forth. For example, maximizing an area may correspond to approaching an object or other environment feature. Similar metrics may be used where the contents i.e. map pixels of a spatial map do not define a binary mask. In general a geometric feature for an intrinsic reward may comprise an affine geometric feature of a spatial map.

There may be an intrinsic reward for each visual entity (e) and for each geometric feature (m). The combination of a visual entity (e) and geometric feature (m) may identify an option (e, m) for the RL subsystem. The reinforcement learning neural network subsystem may be configured to process the internal reward data for the option to determine a corresponding set of state-action Q-values for the option, later "option Q-values". The option Q-values may be used for an action selection policy for the option when performing a series of actions associated with the option. Actions of the series of actions may attempt to maximize a predicted (time discounted) intrinsic reward whilst the option is executed.

The options themselves are associated with geometric features of the spatial maps, that is with geometric features of the learned visual entities which themselves may represent visual appearance, de-emphasizing irrelevant/background features, and highlighting agent-manipulable features. Being grounded in the images of the environment the entities, more particularly spatial maps, on which the options are based may be represented as images, which can facilitate human apprehension of their content, and hence understanding of the behavior of the RL system.

In implementations the reinforcement learning neural network subsystem is configured to select between one of the options, which may be implemented by an option controller, and an atomic action, which may be implemented by a task controller. The selection may be made by a meta-controller; the selection may be in response to a meta Q-value dependent on predicted (time discounted) extrinsic reward from the environment in response to executing either the option of the atomic action, more generally the predicted (time-discounted) extrinsic reward in response to pursuing an action selection policy based on the meta Q-values for future meta-controller selection steps. In some implementations when an option is selected it is pursued until a terminal condition, which may be a defined number of action selection steps. When an atomic action (task) is selected atomic actions may be executed for the same number of action selection steps, for example selecting according to task Q-values for a state-action, based on the predicted (time-discounted) extrinsic reward when following the task action selection policy. In general the action/option selection policies may be epsilon-greedy, selecting an action with a maximum Q-value with a probability of 1−ε and a random action with a probability ε; a value of ε for a policy may be reduced over time during training.

In some implementations the reinforcement learning (RL) neural network subsystem (agent) may have an RL agent structure comprising one or more convolutional neural network layers followed by one or more recurrent neural network layers, for example comprising one or more LSTM (Long Short-Term Memory) layers. The RL neural network subsystem may be configured to receive the observation data and the environmental reward data and may output action data for selecting the actions to be performed. The RL neural network subsystem may be shared between the meta-controller controlling selection of options/atomic tasks, the task controller controlling selection of atomic tasks based on extrinsic rewards, and one or more options controllers configured to control selection of atomic tasks within a selected option. Thus the RL neural network subsystem may have separate heads to provide the meta Q-values, task Q-values, and option Q-values for the separate policies. A Q-value may be provided by providing parameters for a distribution characterizing the Q-value. The RL neural network subsystem may also include a buffer to store experience data representing the internal reward data, the environmental reward data, the observation data, and the action data, for use when training the reinforcement learning neural network subsystem. The reinforcement learning (RL) neural network subsystem may have a distributed architecture such as the an IMPALA (Importance-Weighted Actor-Learner) architecture (Espeholt 2018 arXiv 1802.01561).

In some implementations the reinforcement learning neural network system may be divided between different subsystems in communication with one another, or split entirely. For example the functions of the visual entity identifying neural network subsystem and/or RL neural network subsystem may each be provided as an API. A visual entity identifying neural network subsystem as described above may be used independently of the RL neural network subsystem, for example as a pre-processing front end for a machine learning system. Similarly a RL neural network subsystem as described above may employ a different type of system to generate the spatial maps used to determine the geometric features for the intrinsic rewards.

There is also provided a method of training a visual entity identifying neural network subsystem as described above. The method may comprise backpropagating a gradient of one or more of the loss functions through the visual entity identifying neural network subsystem to learn parameters of the visual entity identifying neural network subsystem and/or embedding vectors representing the discrete visual entities, for example using stochastic gradient descent.

There is also provided a method of training a reinforcement learning neural network system as described above. The method may comprise backpropagating one or more loss functions to learn parameters of the RL neural network subsystem providing the option Q-values and/or meta Q-value and/or task Q-value.

In broad terms a reinforcement learning system may be a system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment is referred to in this specification as an observation.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment; or the agent may be an autonomous or semi-autonomous land or air vehicle navigating through the environment.

As well as images the observations may include, for example, one or more of object position data, and sensor data to capture observations as the agent as it interacts with the environment, for example sensor data from an image, distance, or position sensor or from an actuator. In these implementations, the actions may be control inputs to control the robot or the autonomous or semi-autonomous land or air vehicle.

For example in the case of a robot the observations may include also one or more of: joint position, joint velocity, joint force, torque or acceleration, for example gravity-compensated torque feedback, and global or relative pose of an item held by the robot.

In the case of a robot or other mechanical agent or vehicle the observations may similarly also include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; as well as image or video data for example from a camera or a LIDAR sensor.

Action data from a continuous action space may comprise, for example, position, velocity, or force/torque/acceleration data for one or more joints of a robot or parts of another mechanical agent. Action data may additionally or alternatively comprise electronic control data such as motor control data, or more generally data for controlling one or more electronic devices within the environment the control of which has an effect on the observed state of the environment. For example in the case of an autonomous or semi-autonomous land or air vehicle the actions may comprise actions to control navigation e.g. steering, and movement e.g braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain. The agent may be a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may comprise direct or indirect observations of a state of the protein and/or may be derived from simulation. For example the observations may comprise images of the state of a protein chain from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug. The observations may comprise images of a state of the drug, which may be derived from the physical drug and/or from simulation.

Generally in the case of a simulated environment the observations may comprise simulated versions of one or more of the previously described observations or types of observations and the actions may comprise simulated versions of one or more of the previously described actions or types of actions.

The reinforcement learning system may be system implemented as one or more computer programs on one or more computers in one or more locations in which the systems, components, and techniques described below are implemented.

The subject matter described in this specification can be implemented in particular embodiments so as to realize one or more of the following advantages.

A reinforcement learning neural network system as described herein is able to learn a set of visual entities which can represent environment appearance, object motion, and the ability of the agent to manipulate parts of the environment such as objects. These can form the basis for internal rewards which facilitate the principled construction of a set of options associated with sequences of actions. The RL subsystem or meta-controller is then able to select from these to maximize a predicted external reward. Such a system can learn to perform tasks which other RL systems find difficult or impossible to learn. Thus such a system can provide substantial savings in memory and processing power required to learn a task. For example the system may be able to associate object/action features and landmark features which are spatially relatively far apart in the environment. For example the learned visual entities can provide a set of behavior options which are usable by the agent (RL system) during exploration to improve exploration, and hence result in fast, more efficient learning, with less resource usage and improved final results. Some examples of the system may also be more tolerant to variations in the environment, or in the captured observations of the environment. This can facilitate the system being more generalizable either across tasks or across hardware used to implement the reinforcement learning neural network system. For example implementations of the system may be more tolerant to variations in sensor, actuator or other hardware used to capture the observations and/or perform actions in the environment.

Some implementations of the reinforcement learning neural network system can also provide human-interpretable representations of the internal basis for action selection policies used by the system. These may be presented to a user separately or in combination with representations of observations and/or actions of the system, to facilitate the user understanding the basis for the actions. For example a spatial map or mask dependent upon a collection of concrete and more abstract features may be presented as a visual map. Such a map may be presented separately or overlaid on an image from which the features were derived, for example as a colored or otherwise indicated segmentation of the image into regions which express the concept encoded by the spatial map or mask. In this way concepts used by the RL system to guide its actions can be expressed visually to the human user. Such information can be particularly important for safety and diagnostic purposes. For example it may be used to determine whether or not the RL system is behaving, or is likely to behave, in a safe way and/or it may be used to determine whether or not the system is behaving correctly/as expected, for example for fault-finding. This can be important where, for example, the system is used in an autonomous or semi-autonomous vehicle or robotic application. For example it may potentially be used to determine whether or not a vehicle is aware of road signage, traffic lights, pedestrians and the like.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
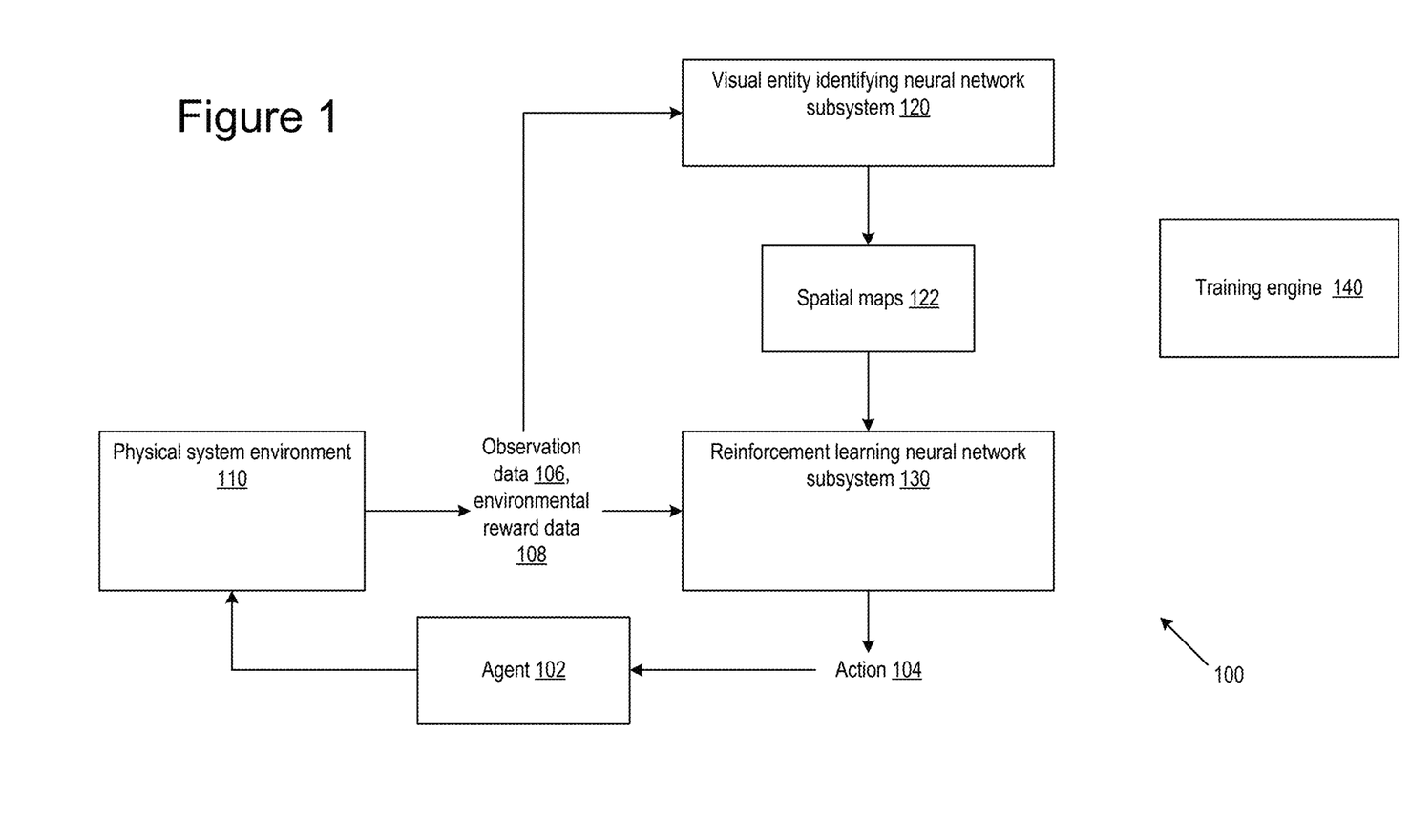
FIG. 1 shows a reinforcement learning neural network system grounded in learned visual entities.

FIG. 1 shows a reinforcement learning neural network system 100 implemented as computer programs on one or more computers in one or more locations. Some implementations of the system aim to learn human-interpretable internal representations of an environment in which the system operates. Behavior of the reinforcement learning neural network system 100 may thus be grounded in learned visual entities.

The reinforcement learning neural network system 100 selects actions 104 to be performed by an agent 102 interacting with an environment 110 at each of multiple time steps. In order for the agent 102 to interact with the environment 110, the system 100 receives observation data 106 characterizing an observation of a current state of the environment and provides action data for selecting an action 104 to be performed by the agent 102 in response to the received observation data 106. The action 104 may be selected from a predetermined set of actions e.g. according to an action value.

At each time step, the system 100 also receives environmental reward data 108 characterizing an external reward based on the current state of the environment 110 and the action 104 of the agent 102 at the time step. Generally, the external reward is a numeric value that reflects the effect of performing the action 104 on the agent 102 accomplishing a particular task. For example, the system 100 may receive an external reward 108 for a given time step based on progress toward the agent 102 accomplishing a task such as navigating to a target location or performing an action in relation to an object in the environment.

In implementations the observation data comprises one or more images of the environment, which may be a real-world or simulated environment. The images may be color images e.g. RGB images, although the colors need not correspond to light or to visible wavelengths of light.

In some applications the agent 102 comprises a mechanical agent interacting with a real-world environment. For example, the agent 102 may be a robot interacting with the environment 110 to accomplish a specific task, or the agent 102 may be an autonomous or semi-autonomous vehicle navigating through the environment. In these cases, the actions 104 may be control inputs to control the robot or the autonomous vehicle.

The reinforcement learning neural network system 100 comprises a visual entity identifying neural network subsystem 120 coupled to a reinforcement learning neural network subsystem 130. The visual entity identifying neural network subsystem 120 is configured to process an images of the environment to observation data determine a set of spatial maps 122. Each spatial map generally corresponds to the image, optionally at a different resolution, and maps a discrete visual entity—that is pixels of the spatial map identify the presence or otherwise of a visual entity at a corresponding location in the image. A visual entity corresponds to a spatial and/or temporal grouping of image pixels. These tend to correlate with human-interpretable entities in the environment such as walls, floor, manipulable objects, background, and the like. They also tend to carry semantic meaning for the reinforcement learning task.

The reinforcement learning neural network subsystem 130 receives and processes the set of spatial maps 122 and environment reward data 108, and in implementations also the observation data 106, to determine action data for selecting action 104. The reinforcement learning neural network subsystem 130 may output the action directly, or it may parameterize one or more distributions of an action selection policy for selecting the action, or it may determine a set of action values (Q-values) for selecting the action. It may be implemented as a distributed reinforcement learning system such as IMPALA (Importance-Weighted Actor-Learner), Espholt et al., arXiv: 1802.01561. The reinforcement learning neural network subsystem 130 uses the mapped visual entities to ground the action selection. In implementations the action selection involves selection between options each of which defines an action selection policy to follow for a number of time steps, and thus involves a compositional options model.

A training engine 140 controls training of the reinforcement learning neural network system 100 according to objective functions described later. The training engine 140 may comprise separate training engines for the visual entity identifying neural network subsystem 120 and for the reinforcement learning neural network subsystem 130, as described later.

Figure 2:
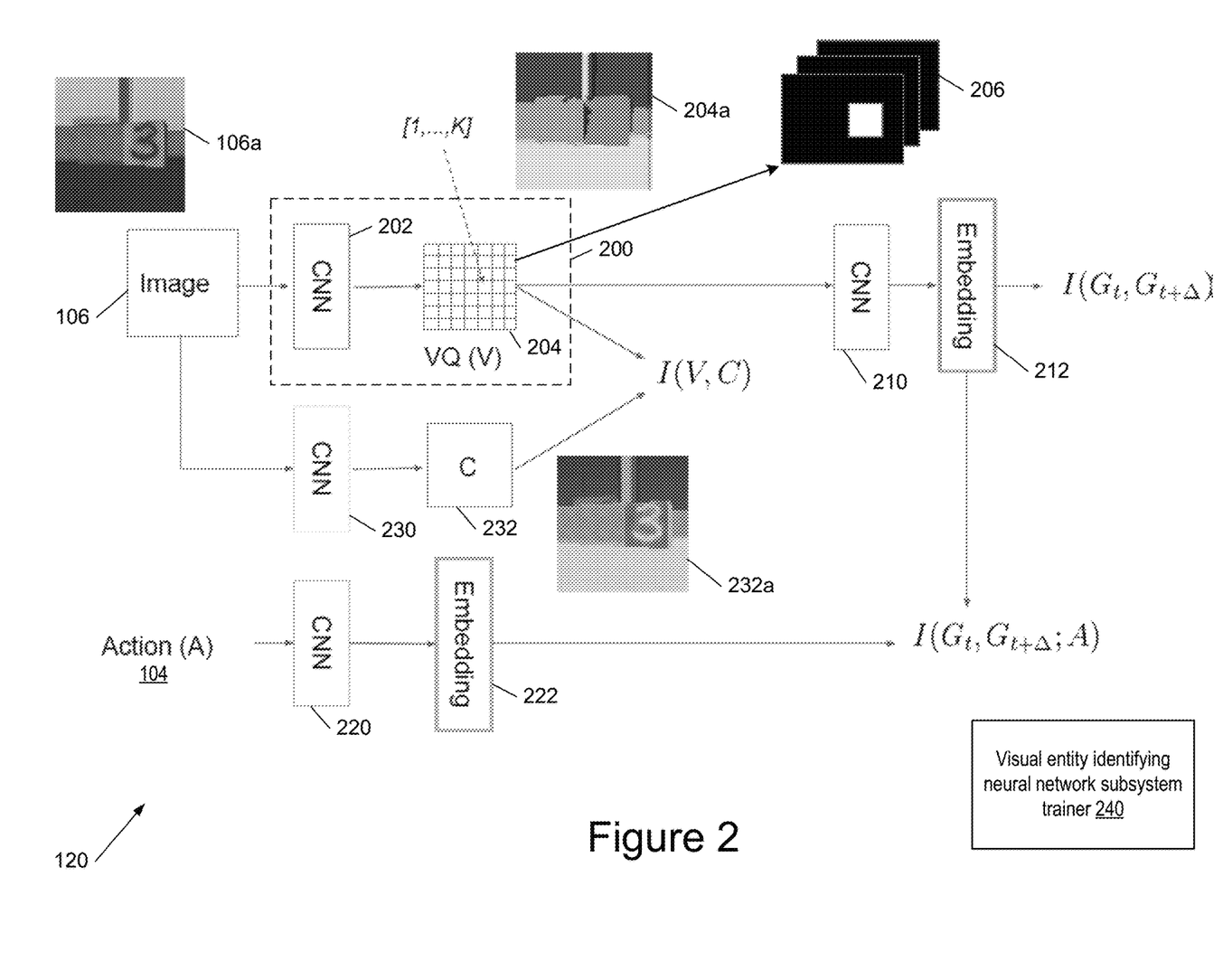
FIG. 2 shows details of an example visual entity identifying neural network subsystem for the reinforcement learning neural network system of FIG. 1.

FIG. 2 shows details of an example visual entity identifying neural network subsystem 120. An observation 106 comprising an image is provided to a vector quantizer 200. In some implementations this comprises a entity encoding neural network 202 configured to determine a K-way categorical value for each pixel of a spatial grid 204 (V) corresponding to the image. That is, each position of the spatial grid is given a value in the range $[1, \ldots, K]$ identifying the pixel as belonging to one of K visual entities. Grouping pixels in this way provides a visual abstraction of the image. FIG. 2 shows an example input image 106a, and a corresponding map of visual entities 204a.

The entity encoding neural network 202 may comprise a convolutional neural network encoder having an output defining a spatial grid with the same resolution as the image. The vector quantization may be performed as described in van den Oord 2017, "Neural Discrete Representation Learning", arXiv: 1711.00937. Other vector quantization techniques may be used; in some implementations spatial maps of visual entities may be generated without using vector quantization.

The set of spatial maps 122 may comprise one spatial map for each of the K visual entities. For example a one-hot encoding of the visual entities may define a set of entity masks 206, a respective mask for each visual entity. For example the vector quantizer 200 may assign an activation for each map pixel to an embedding vector representing one of the discrete visual entities. The nearest embedding vector to an activation vector representing the activation may be identified and the spatial map pixel corresponding to this vector labelled with a 1; the other outputs for this pixel in other spatial maps may be labelled with a 0 to provide a binary mask. The set of entity masks 206 is used as described later for determining intrinsic rewards for the reinforcement learning neural network subsystem 130.

The vector quantizer 200 is configured to learn to disambiguate the visual entities based on the observations. Thus in implementations the visual entity identifying neural network subsystem 120 includes a visual entity identifying subsystem trainer 240 to train the vector quantizer 200 based on information from the observations including one or more of global information, local information, and controllable information.

In implementations the visual entity identifying neural network subsystem 120 includes a frame encoding neural network 210, e.g. a convolutional neural network, to process an output of the vector quantizer 200, e.g. the set of spatial maps, to generate frame embedding data 212 comprising a frame level embedding vector $G_t$. A first classification loss $l(G_t, G_{t+\Delta})$ may be used to train the visual entity identifying neural network subsystem 120, more particularly the vector quantizer 200, to distinguish between frames (i.e. image observations) inside and outside a time window number of frames, $\Delta$, from a current frame. The number of frames, $\Delta$, may be chosen randomly but may be constrained to be greater than a minimum time window from a current frame. The minimum time window may define a long temporal segment e.g. >10 frames or >20 frames; it may have a length which corresponds to the length of an unroll of the reinforcement learning neural network subsystem 130 or the number of steps in an option (described later). In this way the visual entity identifying neural network subsystem 120 may learn to characterize "global" information which distinguishes between observations i.e. image frames, corresponding to different trajectories of states of the environment whilst disregarding irrelevant information e.g. "background" elements in the environment.

In implementations the visual entity identifying neural network subsystem 120 also includes an action encoding neural network 220, e.g. a convolutional neural network, to process an action 104 selected by the reinforcement learning neural network subsystem 130 to generate encoded action data comprising an action embedding 222. A second classification loss $l((G_t, G_{t+1}), A_t)$ may be used to train the visual entity identifying neural network subsystem 120, more particularly the vector quantizer 200, to distinguish between an action $A_t$ taken at time step t, transitioning between frames represented by $(G_t, G_{t+1})$, and actions not selected. In this way the visual entity identifying neural network subsystem 120 may learn to characterize controllable information in image observations of the environment.

In implementations the visual entity identifying neural network subsystem 120 also includes an image appearance encoding neural network 230, e.g. a convolutional neural network, to process an observation 106 comprising an image to provide encoded image appearance data 232. In implementations encoded image appearance data 232 comprises an embedding, C, of local color and/or texture of the image at the same spatial resolution as the image or as spatial grid 204; image 232a shows an example of the embedding C. A third classification loss $l(V_t, C_t)$ may be used to train the visual entity identifying neural network subsystem 120, more particularly the vector quantizer 200, to distinguish between the spatial grid 204 at time t, $V_t$, when aligned with the embedding C at time t, $C_t$, and when spatially misaligned. In this way the visual entity identifying neural network subsystem 120 may learn to characterize local information in image observations of the environment e.g. regions of an image which have a consistent color. This can help to encourage exploration of the environment when the global and controllable information is relatively static.

The first, second and third classification losses may be combined, e.g. in a weighted sum, and used by the visual entity identifying subsystem trainer 240 for unsupervised training of the visual entity identifying neural network subsystem 120. For example a combined loss function, $L_{obs}$, for the visual entity identifying subsystem trainer 240 may be $$L_{obs} = -\alpha_g \log q(G_{t+\Delta}|G_t) - \alpha_c \log q(A_t|G_t, G_{t+1}) - \alpha_a \log q(C_t|V_t)$$

where $\alpha_g$, $\alpha_a$, $\alpha_a$ denote respective weights for the global, controllable, and appearance information terms and each $q(\cdot)$ is a classification loss. In some implementations $q(G_{t+\Delta}|G_t)$ may be modelled as a cosine similarity over the embeddings. Optionally the log $q(G_{t+\Delta}|G_t)$ may be averaged over a series of time steps starting from Δ. The combined loss function may be averaged over a set of time steps.

Merely by way of example, in one implementation the entity encoding neural network 202 comprises a set of 3 convolutional layers with 3×3 kernels with 64 features each followed by ReLU nonlinearities. These are followed by a 1×1 convolutional layer with 8 outputs with L2 normalization. In some implementations spatial grid 204 defines values for 8 visual entities. In implementations the strides of the convolutional kernels are 1 and the spatial grid 204 has the same spatial dimensions as the input image. The frame encoding neural network 210 may comprise a stack of 3×3 convolutions followed by a 2×2 max pooling with stride 2, to reduce the resolution of the output, and a ReLU non-linearity. The output may then be flattened to provide the frame embedding 212. The image appearance encoding neural network 230 may comprise a two-layer 8-filter convolutional neural network with a ReLU non-linearity.

Figure 3:
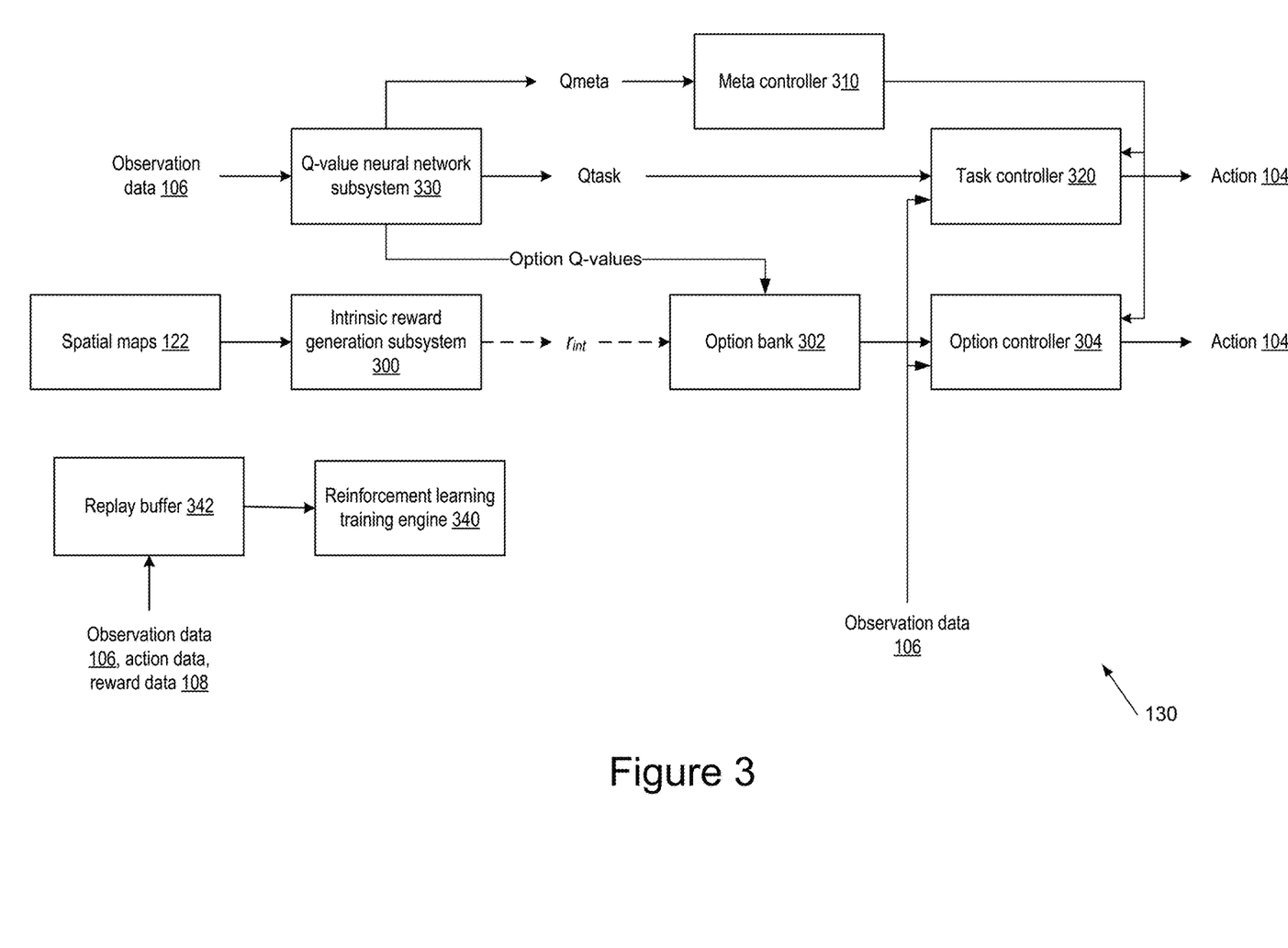
FIG. 3 shows an example reinforcement learning neural network subsystem for the reinforcement learning neural network system of FIG. 1.

FIG. 3 shows an example reinforcement learning neural network subsystem 130. In implementations the spatial maps of the visual entities are processed by an intrinsic reward generation subsystem 300 to generate internal reward data defining one or more intrinsic rewards $r_{int}$ for the reinforcement learning neural network subsystem 130. The intrinsic rewards depend on geometrical properties of the spatial maps and may be determined from the entity masks 206. For example the geometric properties may include the Cartesian coordinates of a centroid of the (binary) spatial map of a visual entity and an area of the spatial map. Where a spatial map is empty the centroid may be at (0,0) and the area may be set to zero. A reward may be defined for maximizing and/or minimizing each of these, in an example implementation defining six geometric features on which intrinsic rewards are based for each visual entity. In implementations there are E×M intrinsic rewards where E is the number of visual entities and M is the number of geometric features. The number of visual entities may be chosen according to the environment; there may be, e.g. in the range 1-20 visual entities.

The use of such intrinsic rewards may help the reinforcement learning neural network subsystem to learn behavioral primitives such as reaching towards an object (maximizing area), avoiding an object (minimizing area), moving away from an object towards the left (minimizing x), and so forth.

The reinforcement learning subsystem is configured to use the intrinsic rewards to learn an option score e.g. an option Q-value for each geometric feature-visual entity combination, these defining an option bank 302. The option Q-values may be trained using off-policy learning. The option Q-values correspond to respective options for the reinforcement learning subsystem. An option may correspond to a series of actions performed in response to a series of observations for a set of N time steps according to an action selection policy determined by an option Q-value for the option. In effect an option may be viewed as an action primitive comprising a set of atomic actions executed for the set of time steps. The action selection policy may be implemented by an option controller 304 to select an action 104 in response to observation data 106. The action selection policy may comprise an epsilon greedy policy; the set of time steps may be a fixed number of time steps e.g. N=20 time steps. In implementations the action 104 is selected from a predetermined set of actions.

The reinforcement learning neural network subsystem 130 includes a meta-controller 310 which provides a meta-action output at a time step, $\alpha_t^{meta}$ re-evaluated every N time steps (i.e. $\alpha_t^{meta}$ may be fixed for N time steps then re-evaluated), based on a meta-Q value $Q^{meta}$. The meta action selects one of E×M+1 possible actions. That is, every N time steps the meta-controller 310 selects one of the E×M options to execute for the next N time steps, or the meta-controller 310 determines that a series of individual, "atomic" tasks should be performed for the next N time steps. In some other implementations, the meta-controller may re-evaluate after each selection of an atomic task. Each of the E×M options has a respective option Q-value $Q^{e,m}$.

The atomic task selection may be implemented by a task controller 320 which is configured to select an action 104 in response to observation data 106 and a task score or Q-value, $Q^{task}$.

The meta-Q value, the task Q-value and the option Q-values may be determined by a Q-value neural network subsystem 330 in response to observation data 106. The Q-value neural network subsystem 330 may have a core neural network comprising one or more convolutional neural network layers followed by a recurrent neural network layer such as an LSTM layer. In some implementations values for $Q^{meta}$, $Q^{task}$ and $Q^{e,m}$ may be provided by separate heads or layers of the core neural network.

A score or Q-value may be provided as an output from a neural network or a neural network may provide an output defining a probability distribution from which a score or Q-value may be selected. A selection dependent upon a score or Q-value may be made by choosing a selection with the highest score or Q-value. Alternatively a probability may be determined for each possible selection of a predetermined set to define a probability distribution across the possible selections, e.g. by processing respective scores or Q-values with a softmax function, and the selection may be made by sampling from this probability distribution. A selection made by the option controller 304, meta-controller 310, or task controller 320 may be made according to an epsilon-greedy policy, which makes a random selection with a probability ϵ and a selection based on a determined score or Q-value with a probability 1−ϵ.

The reinforcement learning neural network subsystem 130 is trained end-to-end by reinforcement learning training engine 340, using off-policy learning based on data stored in a shared reply buffer 342, which stores historical observation data, action data, and external reward data from the environment. In implementations the reinforcement learning training engine 340 is configured to train the Q-values, i.e. corresponding policy and or value functions, asynchronously. The Q-value neural network subsystem 330 is trained to maximize an expected (discounted) external reward from the environment characterized by the reward data 108. The option Q-value outputs are trained to maximize the intrinsic rewards $r_{int}$. Any of a range of reinforcement learning techniques may be used. Early on in training the options bank serves as a useful exploration strategy, whose experience is later subsumed by the $Q^{task}$ function to learn the extrinsic task off-policy using the shared replay buffer.

In some implementations the Q-value neural network subsystem 330 determines Q-values for $Q^{meta}$, $Q^{task}$ and E×M Q-values for $Q^{e,m}$. Each Q-value has a corresponding action selection policy $\pi^{meta}$, $\pi^{task}$, $\pi^{e \times m}$; $Q^{meta}$ is used every N steps whilst $Q^{task}$ and $Q^{e,m}$ are used at every step. The Q-values at time t may be defined as follows:

$$Q^{meta} = \mathbb{E}\left[\sum_{t'=t}^{\infty} \gamma^{t'-t} r_{t'}\right], Q^{task} = \mathbb{E}\left[\sum_{t'=t}^{\infty} \gamma^{t'-t} r_{t'}\right],$$

$$Q^{e,m} = \mathbb{E}\left[\sum_{t'=t}^{\infty} \gamma^{t'-t} r_{t'}^{e,m}\right]$$

where γ is a discount factor less than 1, $r_{t'}$ is the external reward from the environment at time t', $r_{t'}^{e,m}$ is the intrinsic reward at time t', and the expectation is evaluated by following $\pi^{meta}$ for $Q^{meta}$ by following $\pi^{task}$ for $Q^{task}$, and by following $\pi^{e \times m}$ for $Q^{e,m}$.

Each Q-value output from the Q-value neural network subsystem 330 may be trained by minimizing a corresponding loss function, $L_{meta}$, $L_{task}$, and $L_{bank}^{e,m}$. The training may be performed using data previously stored in the reply buffer 342. The stored data may comprise data characterizing tuples $(s_t, (e_t, m_t, a_t), r_t, s_{t+1})$ where $s_t$ comprises data e.g. an image, characterizing an observation at time t, $(e_t, m_t)$ characterize an option selected at time t (where $e_t$=E+1 may represent a series of atomic actions), $a_t$ characterizes an action taken at time t which results in the state transitioning to $s_{t+1}$ and a reward from the environment characterized by $r_t$. An estimate of the $L_{task}$ loss is given by $$L_{task} = [R_\tau - Q^{task}]^2$$

$$R_\tau = \sum_{t=\tau}^{\tau+U-1} \gamma^{t+\tau} r_t + \gamma^{t+U} \max(Q^{task})$$

for a sample of data from the replay buffer stored at time τ, where U is the length of the unroll, i.e. the number of time steps beyond τ used in the calculation, $Q^{task}$ is the estimated Q-value output from the Q-value neural network subsystem 330, and the maximum is the maximum value of $Q^{task}$ over the available actions at time t+U. Estimate of $L_{meta}$ and $L_{bank}^{e,m}$ can be determined similarly, substituting $Q^{meta}$ and $Q^{e,m}$ for $Q^{task}$. These losses may be combined into a total reinforcement learning loss, $L_{RL}$, for the reinforcement learning neural network subsystem 130, $$L_{RL} = \lambda_{task} L_{task} + \lambda_{meta} L_{meta} + \lambda_{bank} \frac{1}{ME} \sum_{e=1}^{E} \sum_{m=1}^{M} L_{bank}^{e,m}$$

where $\lambda_{task}$, $\lambda_{meta}$, and $\lambda_{bank}$ are weights.

Figure 4:
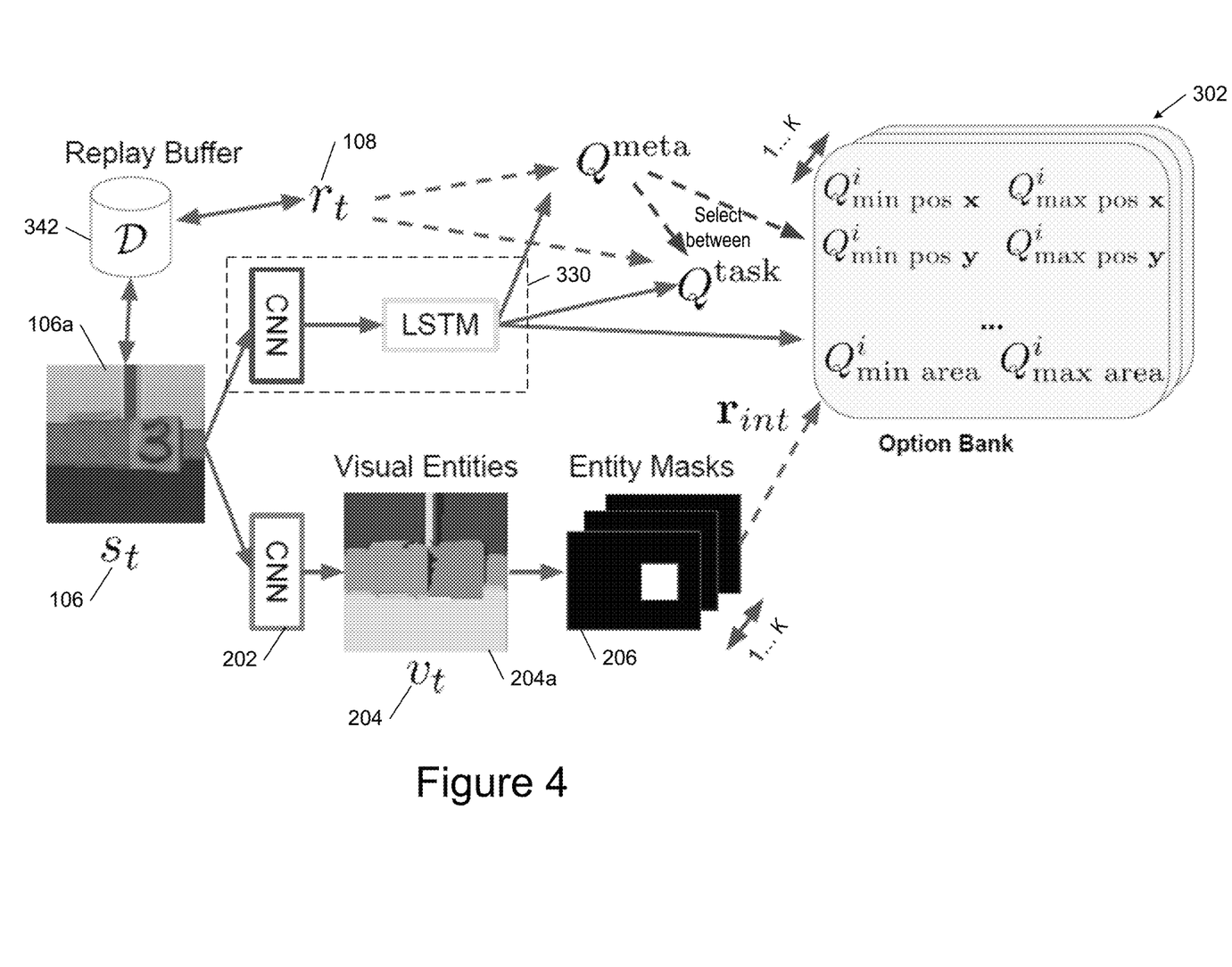
FIG. 4 shows details of an example implementation of the reinforcement learning neural network system of FIG. 1.

FIG. 4 shows details of an example implementation of reinforcement learning neural network system 100 of FIGS. 1-3, in which like elements to those previously described have like reference numerals. FIG. 4 shows a set of spatial maps 204a for an observation image 106a; in image 204a each region corresponds to pixels with temporally consistent labels for a visual entity. One or more image such as image 204a may be provided by the system to facilitate human understanding of the behavior of the system since the learned behavior is grounded in the visual entities i.e. it is possible to understand what the system is "seeing" when it performs a task. In implementations the spatial maps processed by the reinforcement learning neural network subsystem 130 may be provided by a visual entity identifying neural network subsystem other than that illustrated in FIG. 2, e.g. by an external visual subsystem. Merely by way of example, in one implementation the Q-value neural network subsystem 330 comprising a 3-layer convolutional stack with a 512 hidden unit output followed by an LSTM layer and each Q-value is provided by a dueling network architecture (Wang et al. arXiv 1511.06581).

Figure 5:
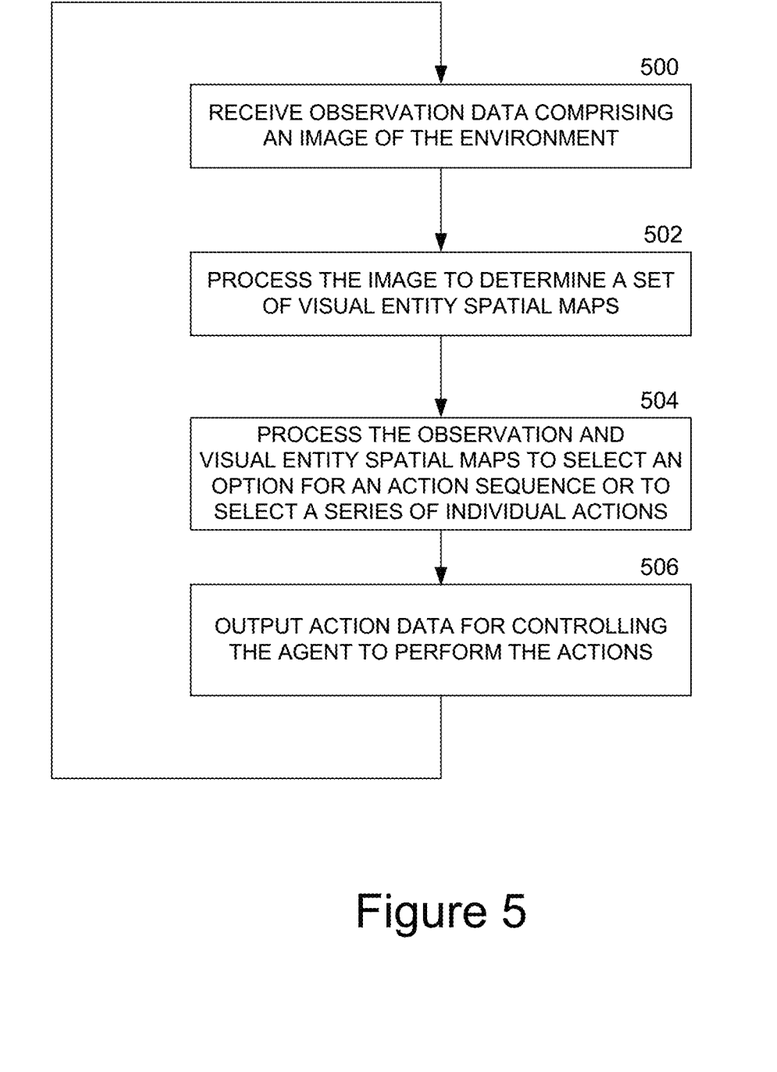
FIG. 5 shows a flow diagram of a process for using the reinforcement learning neural network system of FIG. 1 to perform a task.

FIG. 5 shows a flow diagram of a process for using the reinforcement learning neural network system 100 of FIGS. 1-4 to perform a task. The process receives an observation comprising an image of the environment (step 500) and processes the image with the visual entity identifying neural network subsystem 120 to determine a set of visual entity spatial maps (step 502). The set of visual entity spatial maps and observation and then processed by the reinforcement learning neural network subsystem 130 to select either an option for an action sequence or a series of individual actions (step 504). The system then outputs action data according to the selection for controlling the agent 102 to perform the actions (step 506), and the process loops back to the start.

Figure 6:
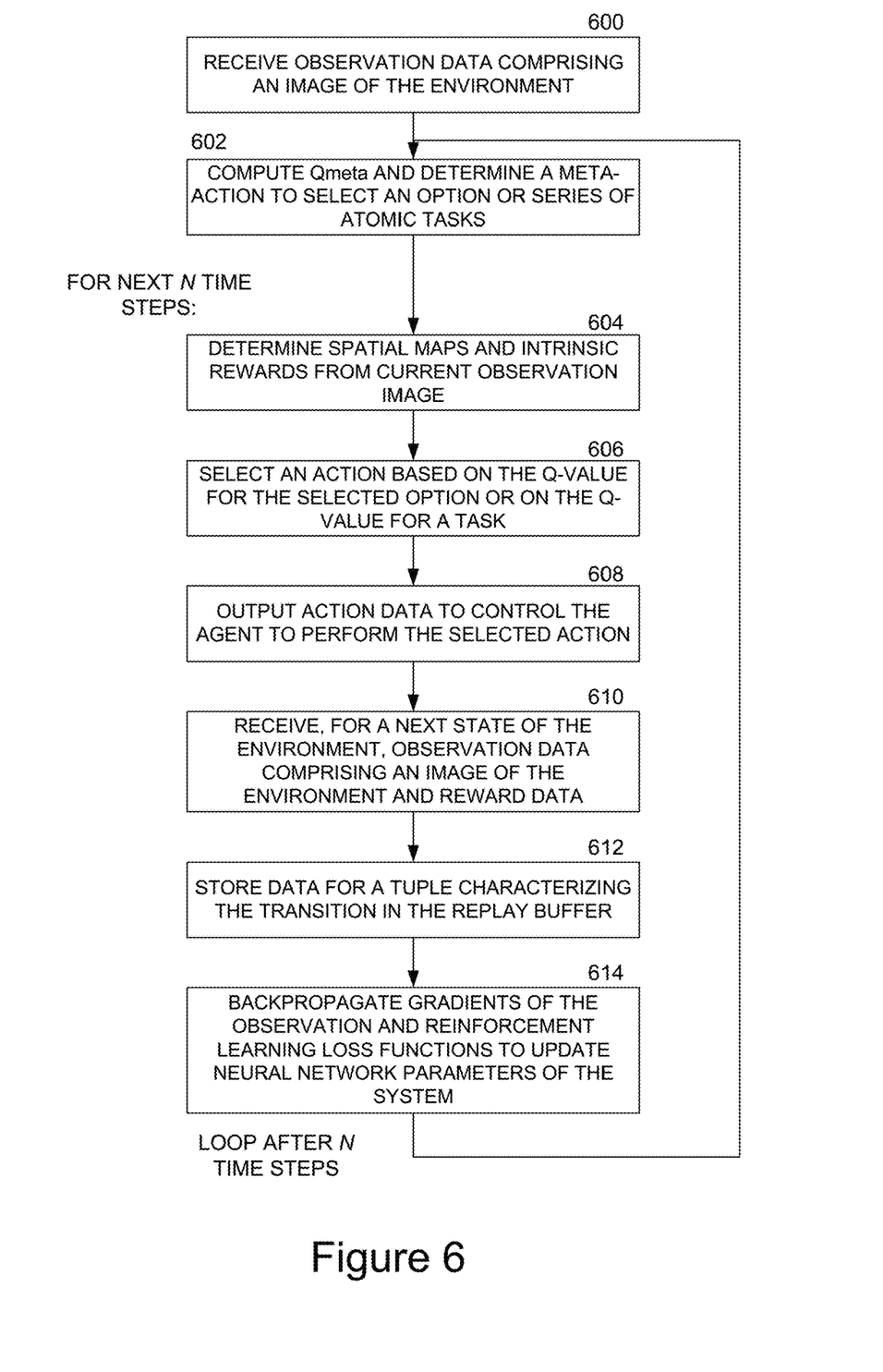
FIG. 6 shows a flow diagram of a process for training the reinforcement learning neural network system of FIG. 1.

FIG. 6 shows a flow diagram of a process for training the reinforcement learning neural network system 100 of FIGS. 1-4. Observation data comprising an image of the environment is received by the system (step 600). Based on this, the Q-value neural network subsystem 330 determines a value for $Q^{meta}$ and the meta-controller 310 uses $Q^{meta}$, e.g. with an epsilon-greedy policy, to determine a meta-action to select either an option or a series of individual tasks (step 602).

The process then executes either the option or the individual tasks for the next N time steps: Thus the image is processed to determine a set of spatial maps for the visual entities in the image, which are in turn used to determine a set of intrinsic rewards as previously described (step 604). The process then selects an action either using the action selection policy for the selected option, i.e. based upon the corresponding option Q-value, or using the Q-value for an individual task, $Q^{task}$, if a series of individual tasks was selected as the meta-action. The process then outputs action data for the selected action to control the agent to perform the action (step 608) and receives observation data, i.e. another image, and reward data, for a next state of the environment (step 610). Data for a tuple characterizing the transition is then stored in the replay buffer 342 (step 612).

The process may then backpropagate gradients of the observation loss $L_{obs}$ to update neural network parameters of the visual entity identifying neural network subsystem 120 and may backpropagate gradients of the reinforcement learning loss $L_{RL}$ to update neural network parameters of the reinforcement learning neural network subsystem 130 (step 614). After performing steps 604-614 N times the process loops back to step 602 to select the next meta-action. In some implementations gradients may be backpropagated after every N steps rather than after every step.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A reinforcement learning neural network system comprising one or more computers and one or more storage devices storing instructions that when executed by the one or more computers cause the one or more computers to perform operations comprising:
   receiving observation data defining an observation of an environment being interacted with by an agent, wherein the observation comprises one or more images of the environment;
   processing the observation data using a visual entity identifying neural network subsystem that is configured to:
      process the observation data to generate a respective activation vector for each of a plurality of map pixels, wherein each map pixel corresponds to a different region of the one or more images, and
      generate, based on the respective activation vectors and for each of the map pixels, assignment data that assigns a respective one of a set of learned discrete visual entities to each of the map pixels to indicate, that the region of the one or more images corresponding to the map pixel is associated with the discrete visual entity;
   selecting one or more actions to be performed by the agent based on the assignment data and the observation data; and
   providing action data identifying the selected action.

2. The reinforcement learning neural network system as claimed in claim 1 wherein the visual entity identifying neural network subsystem comprises an entity encoding neural network configured to encode the observation data into the respective activation for each of the map pixels, and a vector quantizer configured to assign the activation for each map pixel to an embedding vector representing one of the discrete visual entities to assign the respective one of the set of discrete visual entities to the map pixel.

3. The reinforcement learning neural network system as claimed in claim 2 the operations further comprising:
processing image appearance data from the observation data using an image appearance encoding neural network that is configured to encode the image appearance data from the observation data into encoded image appearance data corresponding to the map pixels, and
training the visual entity identifying neural network subsystem with a loss function dependent on a difference between distributions of the encoded image appearance data and the activation for each map pixel.

4. The reinforcement learning neural network system as claimed in claim 2 the operations further comprising:
processing the assignment data using a frame encoding neural network configured to encode the assignment data into frame embedding data for a current frame, and
training the visual entity identifying neural network subsystem to distinguish frames inside and outside a motion time window number of frames distant from the current frame.

5. The reinforcement learning neural network system as claimed in claim 2 the operations further comprising:
processing the action data using an action encoding neural network configured to encode the action data into encoded action data representing one or more actions taken within an action time window, and
training the visual entity identifying neural network subsystem with a loss function dependent on the encoded action data.

6. The reinforcement learning neural network system as claimed in claim 1 wherein selecting the one or more actions comprises:
processing the assignment data to generate internal reward data for one or more intrinsic rewards, wherein the one or more intrinsic rewards depend upon one or more geometrical properties of the visual entities in the one or more images according to the assignment data, and
selecting the one or more actions based on the internal reward data.

7. The reinforcement learning neural network system as claimed in claim 6 wherein generating the internal reward data comprises generating the internal reward data for each visual entity in the set, and wherein the one or more intrinsic rewards comprise measures of one or more of an area, a position, and a centroid, of map pixels that are assigned to the visual entity.

8. The reinforcement learning neural network system as claimed in claim 6 wherein:
selecting the one or more actions comprises determining an option Q-value for each of the geometric properties of each visual entity; and
selecting an option defined by a combination of one of the visual entities and one of the geometric properties and
selecting a series of actions, wherein the actions of the series of actions are selected using the option Q-values for the selected option.

9. The reinforcement learning neural network system as claimed in claim 8 wherein selecting the one or more actions comprises, every N action selection steps, evaluating a meta Q-value dependent upon a predicted return from the extrinsic reward for each of the options and for an individual action, and
determining from the meta Q-value whether to select one of the options for a series of actions or a series of individual actions.

10. The reinforcement learning neural network system as claimed in claim 8 wherein determining an option Q-value for each of the geometric properties comprises processing the intrinsic rewards and the observation using a reinforcement learning neural network subsystem comprising one or more convolutional neural network layers in combination with one or more recurrent neural network layers and a set of neural network heads to provide the Q-values.

11. The reinforcement learning neural network system as claimed in claim 1 the operations further comprising:
generating a respective spatial map for each of the visual entities in the set that identifies for each map pixel whether the map pixel is assigned to the visual entity; and
outputting one or more of the spatial maps for presentation to a user.

12. A method comprising:
receiving observation data defining an observation of an environment being interacted with by an agent, wherein the observation comprises one or more images of the environment;
processing the observation data using a visual entity identifying neural network subsystem that is configured to:
process the observation data to generate a respective activation vector for each of a plurality of map pixels, wherein each map pixel corresponds to a different region of the one or more images, and
generate, based on the respective activation vectors and for each of the map pixels, assignment data that assigns a respective one of a set of learned discrete visual entities to each of the map pixels to indicate that the region of the one or more images corresponding to the map pixel is associated with the discrete visual entity;
selecting one or more actions to be performed by the agent based on the assignment data and the observation data; and
providing action data identifying the selected action.

13. The method as claimed in claim 12 wherein the visual entity identifying neural network subsystem comprises an entity encoding neural network configured to encode the observation data into the respective activations for each of the map pixels, and a vector quantizer configured to assign the activation for each map pixel to an embedding vector representing one of the discrete visual entities to the respective one of the set of discrete visual entities to the map pixel.

14. One or more non-transitory computer-readable storage media storing instructions that when executed by one or more computers cause the one or more computers to perform operations comprising:
receiving observation data defining an observation of an environment being interacted with by an agent, wherein the observation comprises one or more images of the environment;
processing the observation data using a visual entity identifying neural network subsystem that is configured to:
process the observation data to generate a respective activation vector for each of a plurality of map pixels, wherein each map pixel corresponds to a different region of the one or more images, and
generate, based on the respective activation vectors and for each of the map pixels, assignment data that assigns a respective one of a set of learned discrete visual entities to each of the map pixels to indicate, that the region of the one or more images corresponding to the map pixel is associated with the discrete visual entity;
selecting one or more actions to be performed by the agent based on the assignment data and the observation data; and
providing action data identifying the selected action.

15. The computer-readable storage media as claimed in claim 14 wherein the visual entity identifying neural network subsystem comprises an entity encoding neural network configured to encode the observation data into the respective activation for each of the map pixels, and a vector quantizer configured to assign the activation for each map pixel to an embedding vector representing one of the discrete visual entities to assign the respective one of the set of discrete visual entities to the map pixel.

16. The computer-readable storage media as claimed in claim 15, the operations further comprising:
processing image appearance data from the observation data using an image appearance encoding neural network that is configured to encode the image appearance data from the observation data into encoded image appearance data corresponding to the map pixels, and
training the visual entity identifying neural network subsystem with a loss function dependent on a difference between distributions of the encoded image appearance data and the activation for each map pixel.

17. The computer-readable storage media as claimed in claim 15 the operations further comprising:
processing the assignment data using a frame encoding neural network configured to encode the assignment data into frame embedding data for a current frame, and
training the visual entity identifying neural network subsystem to distinguish frames inside and outside a motion time window number of frames distant from the current frame.

18. The computer-readable storage media as claimed in claim 15 the operations further comprising:
processing the action data using an action encoding neural network configured to encode the action data into encoded action data representing one or more actions taken within an action time window, and
training the visual entity identifying neural network subsystem with a loss function dependent on the encoded action data.

19. The computer-readable storage media as claimed in claim 14 wherein selecting the one or more actions comprises:
processing the assignment data to generate internal reward data for one or more intrinsic rewards, wherein the one or more intrinsic rewards depend upon one or more geometrical properties of the visual entities in the one or more images according to the assignment data, and
selecting the one or more actions based on the internal reward data.

20. The computer-readable storage media as claimed in claim 19 wherein generating the internal reward data comprises generating the internal reward data for each visual entity in the set, and wherein the one or more intrinsic rewards comprise measures of one or more of an area, a position, and a centroid, of map pixels that are assigned to the visual entity.

* * * * *